(12) United States Patent
Mariansky

(10) Patent No.: US 9,409,456 B1
(45) Date of Patent: Aug. 9, 2016

(54) VEHICLE TIRE CHAIN APPARATUS

(71) Applicant: Reynaldo Mariansky, Sacramento, CA (US)

(72) Inventor: Reynaldo Mariansky, Sacramento, CA (US)

( * ) Notice: Subject to any disclaimer, the term of this patent is extended or adjusted under 35 U.S.C. 154(b) by 0 days.

(21) Appl. No.: 14/723,561

(22) Filed: May 28, 2015

(51) Int. Cl.
*B60C 27/06* (2006.01)
*B60C 27/08* (2006.01)
*B60C 27/00* (2006.01)
*B60C 27/20* (2006.01)

(52) U.S. Cl.
CPC ............. *B60C 27/068* (2013.04); *B60C 27/003* (2013.04); *B60C 27/062* (2013.04); *B60C 27/08* (2013.01); *B60C 27/20* (2013.01)

(58) Field of Classification Search
CPC .. B60C 27/003; B60C 27/061; B60C 27/062; B60C 27/068; B60C 27/08; B60C 27/20
USPC ............. 152/223, 225 R, 226, 227, 228, 229, 152/230, 219, 209.26
See application file for complete search history.

(56) References Cited

U.S. PATENT DOCUMENTS

| | | | | |
|---|---|---|---|---|
| 1,293,528 A | * | 2/1919 | Palmer | B60C 1/0016 152/158 |
| 1,454,054 A | * | 5/1923 | Kepler | B60C 27/08 152/221 |
| 1,566,938 A | * | 12/1925 | Walty | B60C 27/08 152/228 |
| 1,655,508 A | * | 1/1928 | Odean | B60C 27/08 152/210 |
| 1,742,942 A | * | 1/1930 | Thompson | B60C 27/08 152/227 |
| 1,952,944 A | | 3/1934 | Ruffertshofer | |
| 2,013,064 A | | 9/1935 | Panzica | |
| 2,276,640 A | | 3/1942 | Ansel | |
| 2,687,760 A | * | 8/1954 | Gudalis | B60C 27/12 152/218 |
| 2,952,290 A | * | 9/1960 | Gaspardo | B60C 27/08 152/208 |
| 3,295,582 A | | 1/1967 | Hernikl | |
| 3,955,610 A | | 5/1976 | Freeman | |
| 4,274,463 A | | 6/1981 | Freeman | |
| 4,334,566 A | * | 6/1982 | Augustine | B60C 27/16 152/208 |
| 5,236,026 A | | 8/1993 | Springer | |
| 5,255,577 A | | 10/1993 | Keefauver | |
| 5,285,834 A | * | 2/1994 | Givens | B60C 27/06 152/208 |
| 8,141,605 B2 | * | 3/2012 | Park | B60C 27/22 152/213 R |
| 8,162,017 B2 | | 4/2012 | Miller | |
| 2003/0173011 A1 | * | 9/2003 | Tsuda | B60C 17/0009 152/209.26 |
| 2006/0144493 A1 | * | 7/2006 | Kaufman | B60C 27/16 152/225 R |
| 2011/0220262 A1 | * | 9/2011 | Winton | B60C 27/06 152/228 |

\* cited by examiner

*Primary Examiner* — Kip T Kotter
(74) *Attorney, Agent, or Firm* — Thomas R. Lampe

(57) ABSTRACT

Tire chain apparatus includes chains having a first set of links disposed parallel to the tread and a second set of links projecting outwardly away from the tread, with at least some of the second set of links in tread grooves. Rigid cross member road engaging structures extend across the tread through the chains and have outwardly projecting road engaging protrusions.

12 Claims, 3 Drawing Sheets

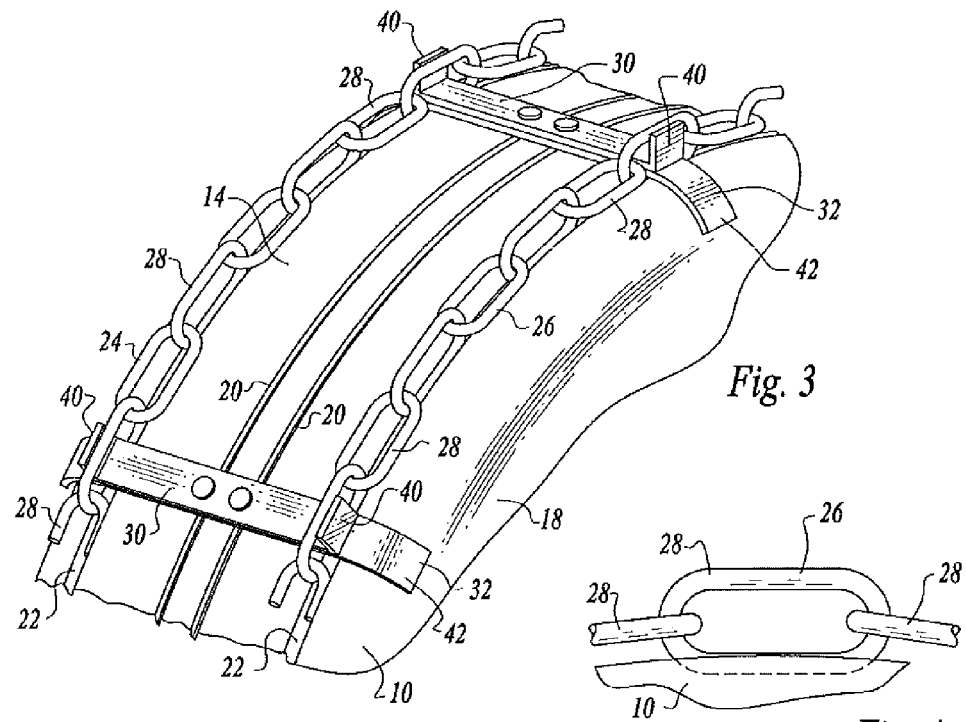
Fig. 3
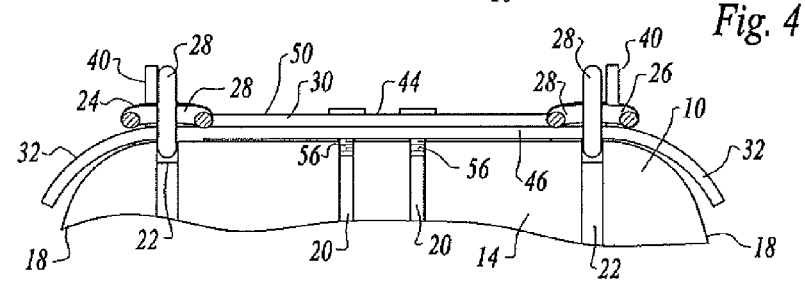
Fig. 4
Fig. 5
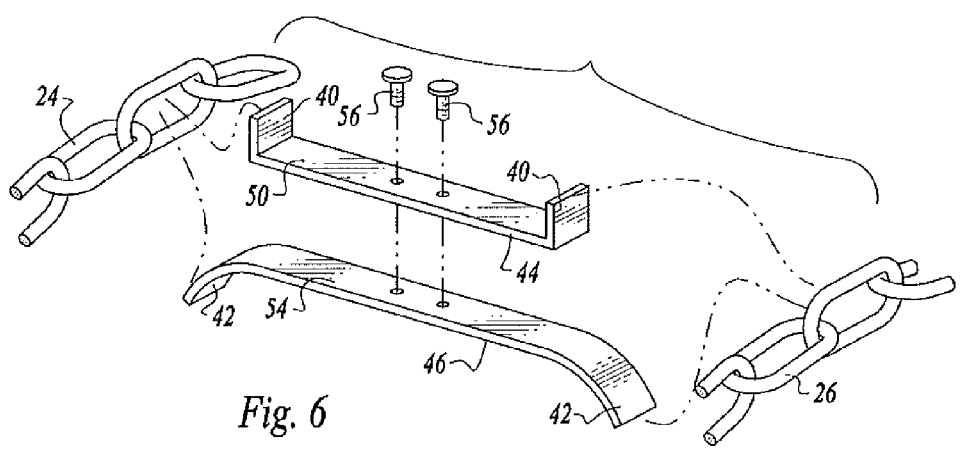
Fig. 6

VEHICLE TIRE CHAIN APPARATUS

TECHNICAL FIELD

This invention relates to tire chains and to the installation of such chains on vehicle tires.

BACKGROUND OF THE INVENTION

It is well known to apply tire chains about the periphery of a vehicle tire in order to increase traction and frictional engagement of the vehicle tire with a soft or slippery surface such as experienced during snow and ice conditions.

Application of a chain to a tire can be a difficult and lengthy chore. Furthermore, some tire chain arrangements, particularly if not installed properly, do not perform the intended function of providing traction in various conditions. Various types of known chain apparatuses are prone to movement relative to the tire, decreasing their effectiveness and possibly presenting a hazardous situation.

The following patents are believed to be representative of the current state of the prior art in this field: U.S. Pat. No. 5,236,026, issued Aug. 17, 1993, U.S. Pat. No. 4,274,463, issued Jun. 23, 1981, U.S. Pat. No. 5,255,577, issued Oct. 26, 1993, U.S. Pat. No. 3,955,610, issued May 11, 1976, U.S. Pat. No. 3,295,582, issued Jan. 3, 1967, U.S. Pat. No. 2,952,290, issued Sep. 13, 1960, U.S. Pat. No. 2,276,640, issued Mar. 17, 1942, U.S. Pat. No. 2,013,064, issued Sep. 3, 1935, U.S. Pat. No. 1,952,944, issued Mar. 27, 1934, and U.S. Pat. No. 8,162,017, issued Apr. 24, 2012.

DISCLOSURE OF INVENTION

The present invention relates to tire chain apparatus that may readily be installed or dis-installed. Furthermore, the tire chain apparatus of the present invention cooperates in a unique manner with the vehicle tire with which it is associated to resist movement between tire and the chain apparatus and also provide a unique, continuous and effective contact between the chain apparatus and the road or other surface upon which the vehicle is operated.

The tire chain apparatus disclosed and claimed herein is for positioning about a vehicle tire having a tread defining spaced, parallel peripheral grooves and opposed tire body sidewalls adjacent to the tread.

The chain apparatus includes first and second chains spaced from one another and having chain links, alternate links of each chain when positioned on a vehicle tire disposed at right angles to one another, forming a first set of links disposed parallel to the tread and a second set of links projecting outwardly away from the tread.

A plurality of double-ended, spaced, substantially rigid cross member road engaging structures extend across the tread through both the first and second chains and through link openings defined by at least some of the second set of links. The cross member road engaging structures have opposed end portions engaging the vehicle tire and including road engaging protrusions projecting outwardly therefrom.

The invention also encompasses a unique installation tool for attaching to end-most cross member road engaging structures employed to apply opposed pulling forces thereto to tighten the chains for application to a tire.

Other features, advantages and objects of the present invention will become apparent with reference to the following description and accompanying drawings.

BRIEF DESCRIPTION OF DRAWINGS

FIG. 3 is an enlarged, perspective view showing a portion of the tire and installed tire chain apparatus;

FIG. 4 is a greatly enlarged, side view showing tire chain apparatus links, one of which extends outwardly from a peripheral groove of the vehicle tire;

FIG. 5 is an enlarged elevational end view showing a top portion of the tire and a cross member road engaging structure in place thereon in association with links, a link of each chain positioned in a peripheral groove of the vehicle tire;

FIG. 6 is an enlarged, exploded perspective view showing link portions and structural elements of a dis-assembled cross member road engaging structure;

BEST MODE FOR CARRYING OUT THE INVENTION

Figure 1:
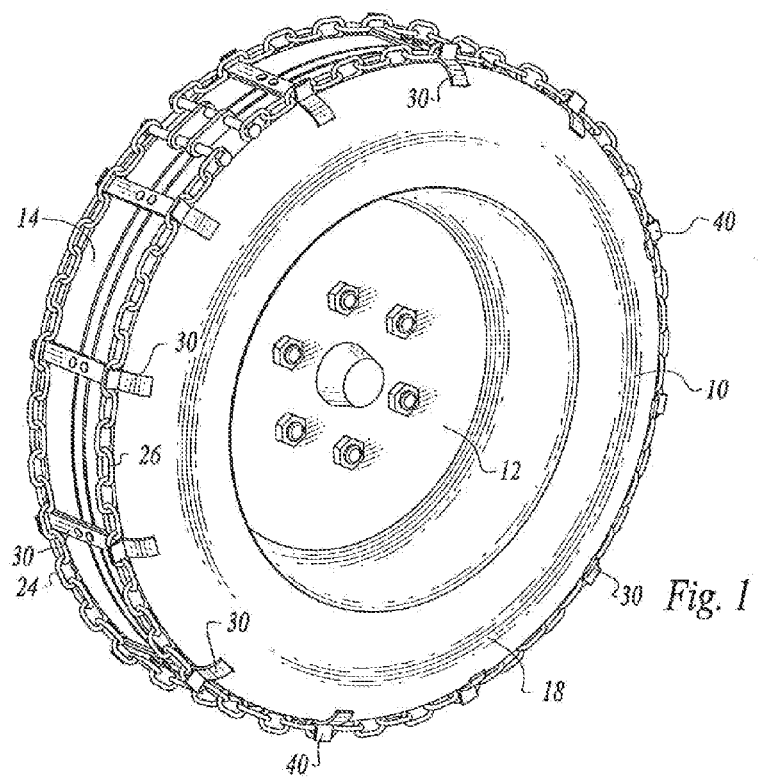
FIG. 1 is a side perspective view of a wheel mounted vehicle tire having tire chain apparatus constructed in accordance with the teachings of the present invention installed on the tire.
Figure 2:
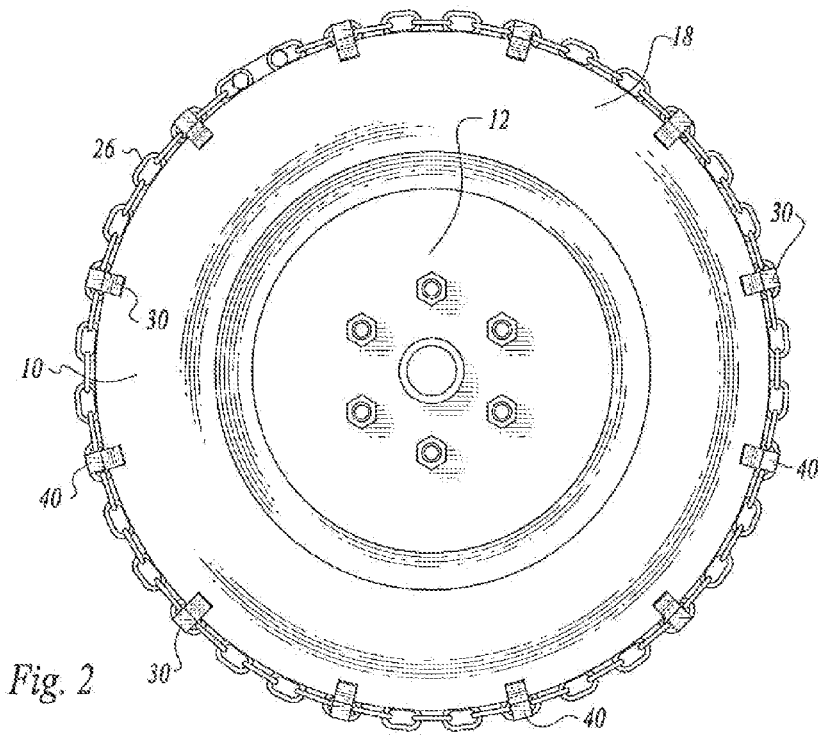
FIG. 2 is a side elevation view of the wheel, tire and installed tire chain apparatus.

Referring now to the drawings, a vehicle tire 10 is shown mounted on a wheel 12. As is conventional, the tire has a tread 14 defining spaced, parallel peripheral grooves and opposed tire body sidewalls 18 adjacent to the tread. In this instance, the grooves include two inner grooves 20 and two outer grooves 22.

The tire chain apparatus of the present invention includes two chains 24, 26 spaced from one another. Each chain has chain links 28, alternate links of each chain when positioned on a vehicle tire disposed at right angles to one another forming a first set of links disposed parallel to the tread 14 and a second set of links projecting outwardly away from the tread. More particularly, as shown in the drawings, every other link in each chain is positioned in an outer groove 22.

The tire chain apparatus also includes a plurality of double-ended, spaced, substantially rigid cross member road engaging structures 30 extending across the tread through both of the chains 24, 26 and through the link openings defined by some of the second set of links. The cross member road engaging structures have opposed end portions 32 including road engaging protrusions 40 projecting outwardly therefrom.

The protrusions are located between the chains 24, 26 and the tire body sidewalls 18 for restricting movement of the chains relative to the vehicle tire. The protrusions preferably project outwardly beyond the links when the tire chain apparatus is installed.

The opposed end portions 32 include curving segments 42 adjacent to the protrusions curving in the directions of the tire body sidewalls. Engagement between the curving segments and the tire also serves to maintain the cross member road engaging structures properly positioned relative to the tire.

As may perhaps best be seen with reference to FIGS. 5 and 6, the rigid cross member road engaging structures include separable upper component 44 and lower component 46. The upper component comprises a metal bar having an elongated straight bar segment 50 and two upturned bar segments at the ends of the straight bar segment forming the road engaging protrusions 40. The lower rigid component 46 comprises a metal bar having a straight bar segment 54 and the curving segments 42 extending from the ends thereof.

The cross member road engaging structures also include two inwardly extending stabilizer elements comprising threaded fasteners 56 which hold the upper and lower components 44, 46 together and also are positioned in inner grooves 20. This feature also adds to the stability of the chain apparatus relative to the tire.

Figure 7:
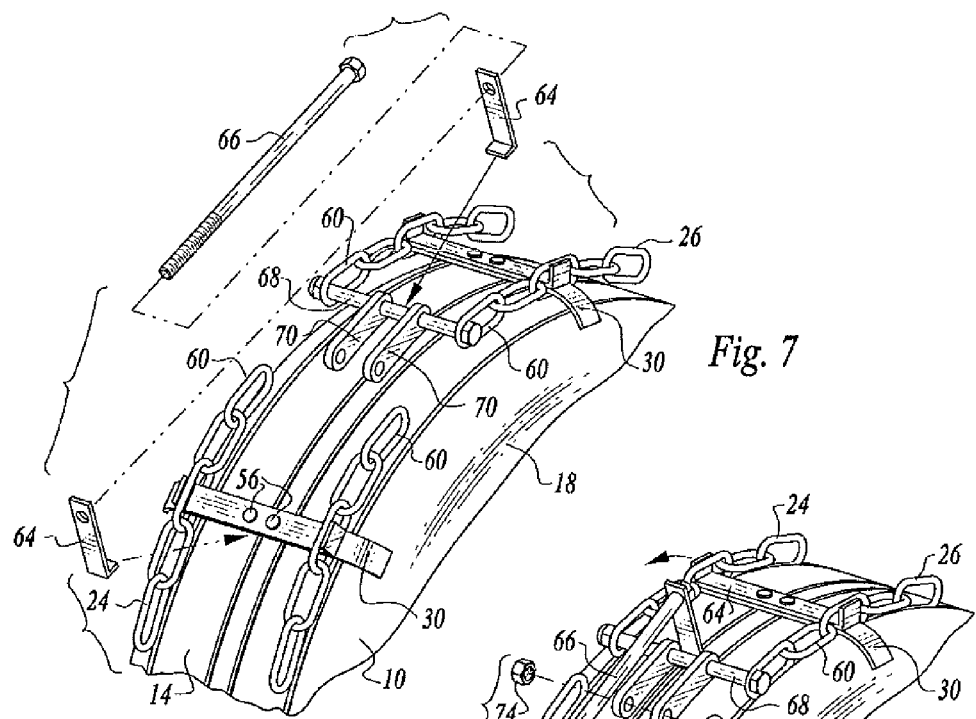
FIG. 7 is a perspective view showing end portions of the chain apparatus positioned over an upper portion of a tire for installation of the tire chain apparatus on the tire, showing dis-assembled structural elements of a tool to be employed in the installation also being illustrated.
Figure 8:
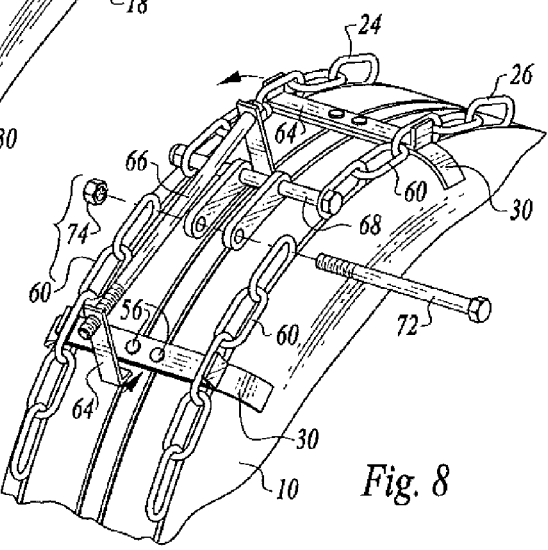
FIG. 8 is a view similar to FIG. 7, but showing the tool assembled and in the position it assumes when tensioning the chains of the chain apparatus during the installation process.
Figure 9:
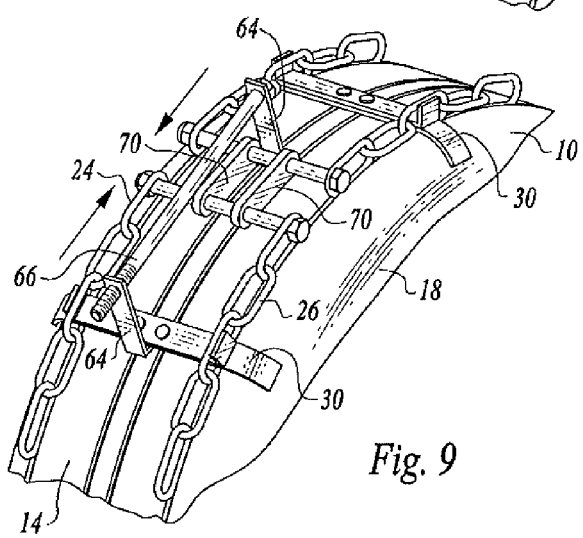
FIG. 9 is a view similar to FIGS. 7 and 8, but illustrating the chain apparatus installed on the tire and prior to removal of the tool.

FIGS. 7-9 relate to and illustrate installation of the tire chain apparatus on tire 10. The chains 24, 26 each include chain end portions 60 comprising interconnecting chain links 28 extending from the end-most cross member road engaging structures 30. As shown in FIG. 7, the chain end portions at both ends of the chains are positioned on the tire tread, the chains being wrapped about the tire. A gap exists between the chain end portions.

An installation tool is provided to tighten the chains during installation on a tire. The tool includes two engagement members 64 and a rod 66 threaded at an end thereof passing through openings in the engagement members and threadedly connected to one of the engagement members. FIG. 8 shows one of the engagement members 64 being attached to one of the end-most cross member road engaging structures by inserting the lower end of the engagement member thereunder between fasteners 56. The other engagement member 64 engages a bolt 68 passing through end-most links of the other pair of chain portions 60 which holds a pair of connector links 70. A nut threaded onto bolt 68 is welded thereto. The bottom end of the engagement member 64 at the non-threaded end of rod 66 is positioned under bolt 68 (between the connector links 70) and engages the tire.

Rotation of the rod 66 at the head end thereof exerts opposed pulling forces on the engagement members and pulls them together to bring the end-most links of the chain end portions at one chain end into registration with holes in the connector links 70. This is shown in FIG. 8.

When the chains have been tightened to a desired degree, a threaded connector bolt 72 is inserted through the links of the chains located at one end of the chain and holes in connector links 70. A nut 74 is then secured to the threaded connector bolt 72. The tool is then removed until it is again utilized.

The number of cross member road engaging structures and their proximity to one another should be sufficient to ensure that at least two of the cross member road engaging structures engage the road or other vehicle support surface at all times.

The invention claimed is:

1. Tire chain apparatus for positioning about a vehicle tire having a tread defining spaced, parallel peripheral grooves and opposed tire body sidewalls adjacent to the tread, said chain apparatus comprising, in combination:

first and second chains spaced from one another and having chain links, alternate links of each chain when positioned on said vehicle tire disposed at right angles to one another forming a first set of links disposed parallel to the tread and a second set of links projecting outwardly away from the tread;

a plurality of double-ended, spaced, substantially rigid cross member road engaging structures extending across the tread through both of said first and second chains and through link openings defined by at least some of said second set of links, the cross member road engaging structures having opposed end portions engaging said vehicle tire and including road engaging protrusions projecting outwardly therefrom, said cross member road engaging structures including a plurality of inwardly extending stabilizer elements positioned in a plurality of said spaced, parallel peripheral grooves, said plurality of inwardly extending stabilizer elements comprising threaded fasteners.

2. The tire chain apparatus according to claim 1 wherein said protrusions are located between said chains and said tire body sidewalls for restricting movement of said chains relative to said vehicle tire.

3. The tire chain apparatus according to claim 2 wherein said opposed end portions include curving segments adjacent to said protrusions curving in the directions of the tire body sidewalls.

4. The tire chain apparatus according to claim 1 wherein the links of said second set of links are positioned in and extend outwardly from two of the peripheral grooves of said vehicle tire.

5. The tire chain apparatus according to claim 1 wherein said rigid cross member road engaging structures each include separable upper and lower rigid components, said threaded fasteners connecting said upper and lower rigid components.

6. The tire chain apparatus according to claim 5 wherein said upper rigid component comprises a metal bar having an elongated substantially straight bar segment and two upturned bar segments at the ends of said substantially straight bar segment forming said road engaging protrusions.

7. The tire chain apparatus according to claim 5 wherein said lower rigid component comprises a metal bar having an elongated substantially straight bar segment and two curving segments at the ends of said substantially elongated straight bar segment curving in the direction of said tire body sidewalls.

8. Tire chain apparatus for positioning about a vehicle tire having a tread defining spaced, parallel peripheral grooves and opposed tire body sidewalls adjacent to the tread, said chain apparatus comprising, in combination:

first and second chains spaced from one another and having chain links, alternate links of each chain when positioned on said vehicle tire disposed at right angles to one another forming a first set of links disposed parallel to the tread and a second set of links projecting outwardly away from the tread;

a plurality of double-ended, spaced, substantially rigid cross member road engaging structures extending across the tread through both of said first and second chains and through link openings defined by at least some of said second set of links, the substantially rigid cross member road engaging structures having opposed end portions engaging said vehicle tire and including road engaging protrusions projecting outwardly therefrom, said substantially rigid cross member road engaging structures including end-most substantially rigid cross member road engaging structures and said chains each including chain end portions comprising interconnecting chain links extending from the end-most substantially rigid cross member road engaging structures, the chain end portions of each chain releasably connected by connector structure including connector bolts extending through links of said chain end portions and exerting pulling forces thereon.

9. The tire chain apparatus according to claim 8 wherein said connector structure additionally includes connector links defining openings receiving said connector bolts.

10. The tire chain apparatus according to claim 9 additionally comprising an installation tool for attachment to one of said end-most substantially rigid cross member road engaging structures and one of said connector bolts employed to apply opposed pulling forces thereto to tighten said chains.

11. The tire chain apparatus according to claim 10 wherein said tool includes two engagement members for engaging one of said end-most substantially rigid cross member road engaging structures and one of said connector bolts, and a threaded rod interconnecting said engagement members and operably associated therewith to apply opposed pulling forces thereto.

12. The tire chain apparatus according to claim 9 including nuts secured to said connector bolts, said connector bolts having bolt heads, the bolt heads and the nuts engageable with said chain end portions.

\* \* \* \* \*